(12) United States Patent
Takahashi

(10) Patent No.: US 9,123,242 B2
(45) Date of Patent: Sep. 1, 2015

(54) PAVEMENT MARKER RECOGNITION DEVICE, PAVEMENT MARKER RECOGNITION METHOD AND PAVEMENT MARKER RECOGNITION PROGRAM

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 702 days.

(21) Appl. No.: 12/746,407

(22) PCT Filed: Dec. 3, 2008

(86) PCT No.: PCT/JP2008/071925
§ 371 (c)(1),
(2), (4) Date: Jun. 4, 2010

(87) PCT Pub. No.: WO2009/072507
PCT Pub. Date: Jun. 11, 2009

(65) Prior Publication Data
US 2010/0259609 A1 Oct. 14, 2010

(30) Foreign Application Priority Data
Dec. 5, 2007 (JP) .................. 2007-314512

(51) Int. Cl.
*H04N 7/00* (2011.01)
*H04N 7/18* (2006.01)
*G09B 9/00* (2006.01)
*G06K 9/46* (2006.01)
*G06K 9/66* (2006.01)
*G06K 9/72* (2006.01)
*G08G 1/0967* (2006.01)
*G06K 9/00* (2006.01)

(52) U.S. Cl.
CPC ...... *G08G 1/096716* (2013.01); *G06K 9/00798* (2013.01); *G06K 9/72* (2013.01); *G08G 1/096791* (2013.01); *H04N 7/18* (2013.01)

(58) Field of Classification Search
None
See application file for complete search history.

(56) References Cited

U.S. PATENT DOCUMENTS 7,295,682 B2 * 11/2007 Otsuka et al. ............... 382/103
7,668,341 B2     2/2010 Miyajima et al.
8,144,926 B2 *  3/2012 Mori et al. .................. 382/103

(Continued)

FOREIGN PATENT DOCUMENTS

| JP | 2003-207358 A | 7/2003 |
| JP | 2006-24105 A | 1/2006 |

(Continued)

*Primary Examiner* — Joseph Ustaris
*Assistant Examiner* — Edemio Navas, Jr.
(74) *Attorney, Agent, or Firm* — Foley & Lardner LLP

(57) ABSTRACT

A pavement marker recognition device for recognizing a pavement marker accurately is provided, the device being capable of recognizing an object even when it is difficult to be recognized only from tones or color information. A pavement marker candidate extraction unit extracts an image area having a feature similar to that of a pavement marker from an image captured by a car-mounted camera as a pavement marker candidate area, a road shape analysis unit analyzes the road shape from the image captured by the car-mounted camera, and a pavement marker verification unit determines whether the road shape analyzed by the road shape analysis unit and the pavement marker candidate area extracted by the pavement marker candidate extraction unit are in a correspondence relationship indicated by a road shape and pavement marker correspondence table, and based on the determination result, recognizes the pavement marker candidate area as a true pavement marker.

20 Claims, 19 Drawing Sheets

(56) References Cited

U.S. PATENT DOCUMENTS

| | | | |
|---|---|---|---|
| 2001/0056326 A1* | 12/2001 | Kimura | 701/208 |
| 2002/0031242 A1* | 3/2002 | Yasui et al. | 382/104 |
| 2002/0134151 A1* | 9/2002 | Naruoka et al. | 73/291 |
| 2006/0178807 A1* | 8/2006 | Kato et al. | 701/117 |
| 2006/0228000 A1* | 10/2006 | Miyajima et al. | 382/104 |
| 2007/0041614 A1* | 2/2007 | Tanji | 382/104 |
| 2007/0147664 A1* | 6/2007 | Kubota et al. | 382/106 |
| 2010/0329513 A1* | 12/2010 | Klefenz | 382/104 |

FOREIGN PATENT DOCUMENTS

| | | |
|---|---|---|
| JP | 2006-38558 A | 2/2006 |
| JP | 2006-209510 A | 8/2006 |
| JP | 2006-309313 A | 11/2006 |
| JP | 2007-147564 A | 6/2007 |

\* cited by examiner

FIG.7

| PAVEMENT MARKER TYPES | FEATURES OF ROAD SHAPE WHERE PAVEMENT MARKER IS PRESENT |
|---|---|
| T-SHAPE, CROSS-SHAPE | WITHIN JUNCTION OF T-JUNCTION, CROSS-JUNCTION RESPECTIVELY. NEAR CENTER OF JUNCTION. |
| ARROW | MUTIPLE-LANE ROAD (GO-STRAIGHT ARROW IS PRESENT EVEN IN DOUBLE LANE) |
| "STOP" | IMMEDIATELY BEFORE AND AFTER JUNCTION |
| STOP LINE | IMMEDIATELY BEFORE AND AFTER JUNCTION, IMMEDIATELY BEFORE AND AFTER CROSSWALK |

FIG.8

| PAVEMENT MARKER TYPES | FEATURES OF ROAD SHAPE WHERE PAVEMENT MARKER IS NOT PRESENT |
|---|---|
| T-SHAPE, CROSS-SHAPE | ROAD WHERE BOTH SIDES ARE COMPLETELY SURROUNDED BY WALLS OR TREES ONE SIDE MULTIPLE-LANE ROAD |
| ARROW | DOUBLE LANE (EXCEPT FOR GO-STRAIGHT ARROW) |
| "STOP" | ROAD WHERE BOTH SIDES ARE COMPLETELY SURROUNDED BY WALLS OR TREES, HIGHWAY, ONE-SIDE MULTIPLE-LANE ROAD |
| STOP LINE | ROAD WHERE BOTH SIDES ARE SURROUNDED BY WALLS |

FIG.9

| CASE | ROAD SHAPE ANALYSIS RESULTS | PAVEMENT MARKER CANDIDATE RECOGNITION RESULTS |
|---|---|---|
| (a) | T-JUNCTION (3~5m AHEAD OF SELF VEHICLE) | T-MARKER (3m AHEAD OF SELF VEHICLE) |
| (b) | WALLS ON RIGHT AND LEFT (2~8m AHEAD OF SELF VEHICLE) | T-JUNCTION (3m AHEAD OF SELF VEHICLE) |
| (c) | THREE-LANE ROAD | T-JUNCTION (3m AHEAD OF SELF VEHICLE) |

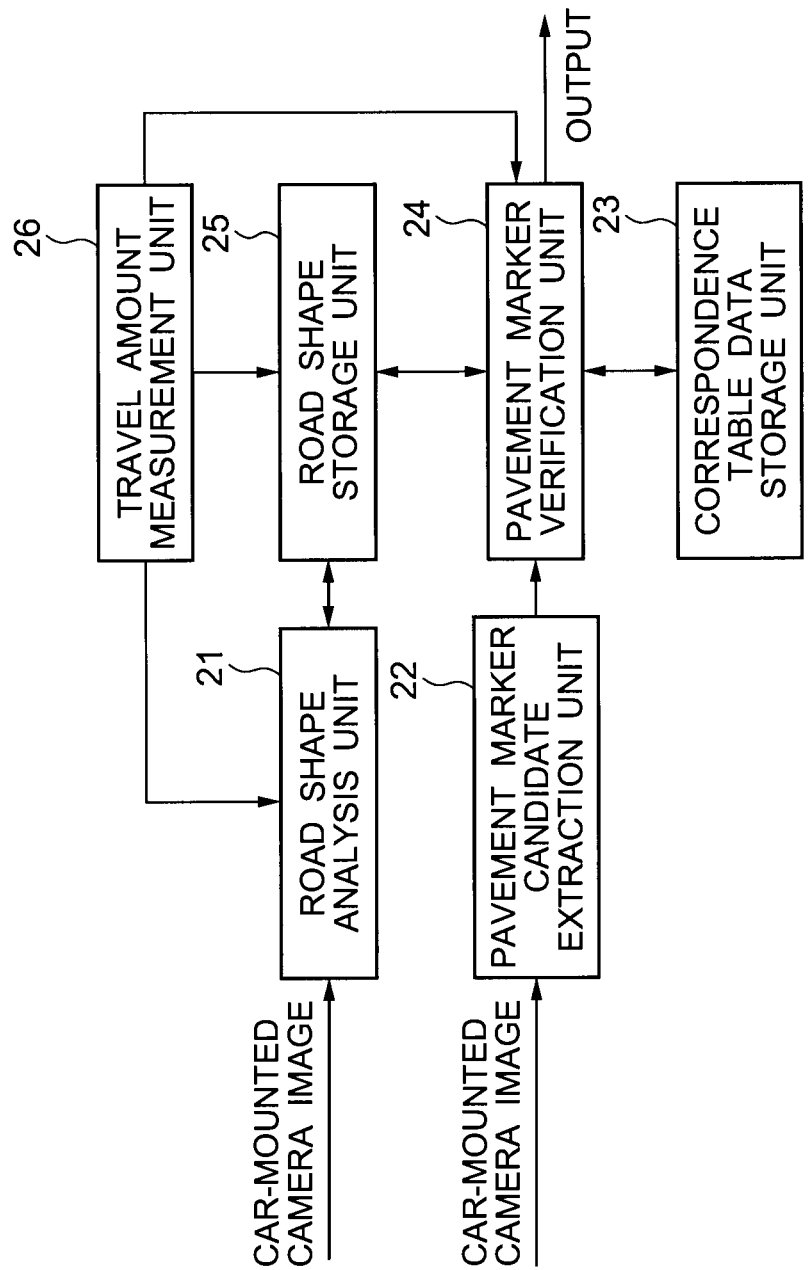

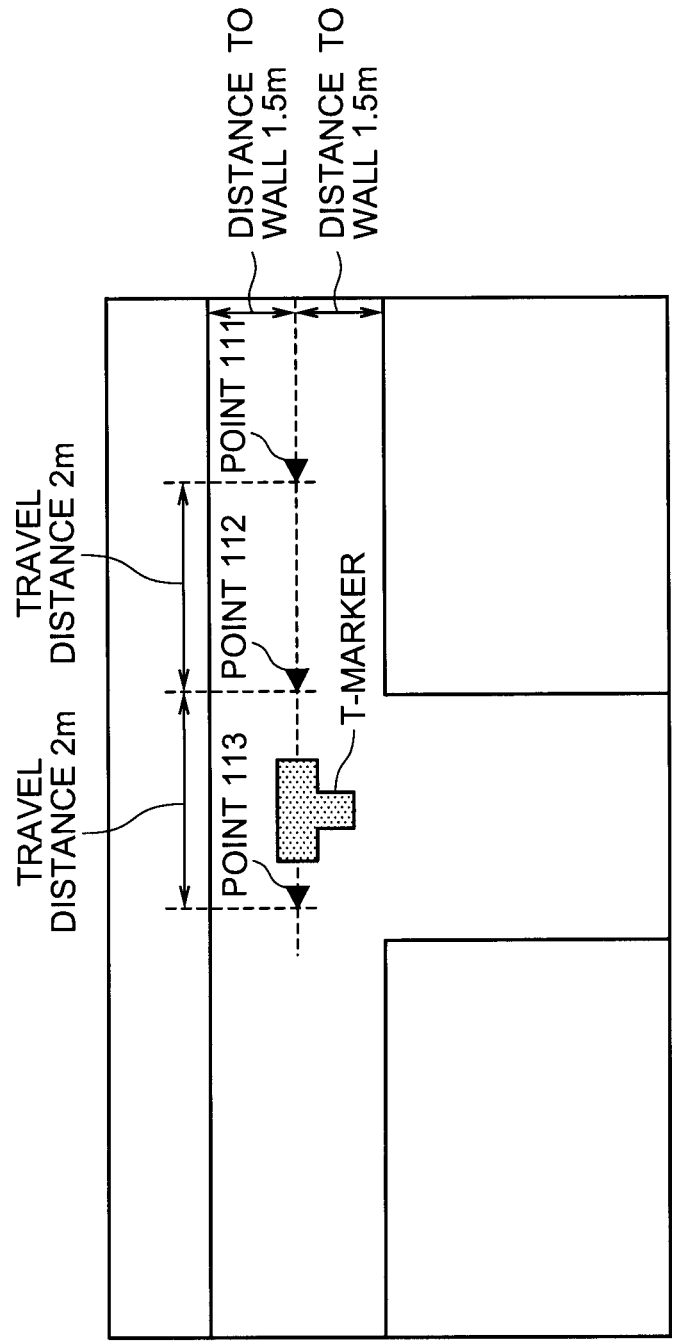

FIG.12

| | | ROAD ANALYSIS RESULT | PAVEMENT MARKER CANDIDATE RECOGNITION RESULT |
|---|---|---|---|
| (a) | POINT 111 TIME T₁ | • WALLS ON RIGHT AND LEFT AT 1.5m<br>• NO WALL ON LEFT SIDE IN RANGE OF 2~4.5m AHEAD<br>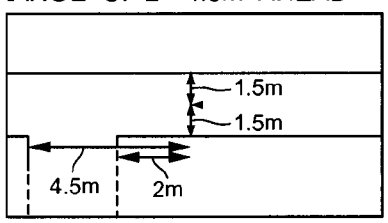<br>SELF VEHICLE TRAVELING DIRECTION | • NO PAVEMENT MARKER CANDIDATE |
| (b) | POINT 112 TIME T₂ | • WALLS ON RIGHT AND LEFT AT 1.5m<br>• NO WALL ON LEFT SIDE IN RANGE OF 0~2.5m AHEAD<br>• WALL CROSSING CURRENTLY RUNNING ROAD AT RIGHT ANGLE ON LEFT SIDE AT 2.5m AHEAD<br>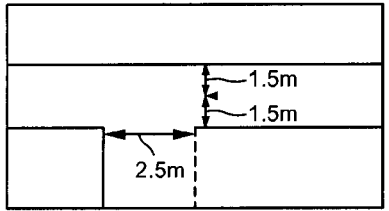<br>SELF VEHICLE TRAVELING DIRECTION | • NO PAVEMENT MARKER CANDIDATE |
| (c) | POINT 113 TIME T₃ | • WALLS ON RIGHT AND LEFT AT 1.5m<br>• NO WALL ON LEFT SIDE IN RANGE OF 0.5m AHEAD TO 2m BEHIND<br>• IN PART WITHOUT LEFT SIDE WALL, WALL CROSSING CURRENTLY RUNNING ROAD AT RIGHT ANGLE, THIS IS WITHIN T-JUNCTION<br>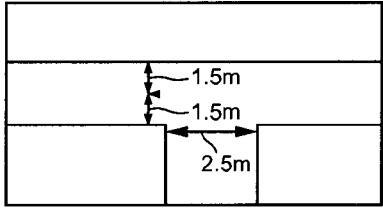<br>SELF VEHICLE TRAVELING DIRECTION | • T-MARKER CANDIDATE DETECTED (LOCATION: 0~1.5m BEHIND SELF VEHICLE, IN RANGE FROM 0.75m LEFT TO 0.75m RIGHT) |

FIG.13

|  | PAVEMENT MARKER CANDIDATE RECOGNITION RESULT |
|---|---|
| POINT 111 | • NO PAVEMENT MARKER CANDIDATE |
| POINT 112 | • NO PAVEMENT MARKER CANDIDATE |
| POINT 113 | • T-MARKER DETECTED (LOCATION: 2~3.5m BEHIND SELF VEHICLE, IN RANGE OF 0~1.5m LEFT) |

PAVEMENT MARKER RECOGNITION DEVICE, PAVEMENT MARKER RECOGNITION METHOD AND PAVEMENT MARKER RECOGNITION PROGRAM

This application is the National Phase of PCT/JP2008/071925, filed Dec. 3, 2008, which claims priority to Japanese Application No. 2007-314512, filed Dec. 5, 2007, the disclosures of which are hereby incorporated by reference in their entirety.

TECHNICAL FIELD

The present invention relates to a pavement marker recognition device, a pavement marker recognition method, and a pavement marker recognition program, for recognizing pavement markers drawn on pavements from images of running pavements photographed by car-mounted cameras.

BACKGROUND ART

Art for supporting driving of vehicles by recognizing images captured by car-mounted cameras have been well known. Such art includes devices which notify presence of junctions by recognizing stop lines painted on roads from images captured by car-mounted cameras, and devices which recognize pavement markers from images capture by car-mounted cameras and identify and display detailed current positions of the traveling vehicles.

Such art requires highly accurate image recognition for supporting safe driving of vehicles, and related art is disclosed in Patent Documents 1 and 2.

Patent Document 1 discloses a pavement marker detection device which recognizes running road of a vehicle from an image captured by a camera, sets a detection line within an image area of the vehicle running road recognized in the image captured by the camera, and detects a pavement marker according to changes in tones in the pixels on the detection line. In the pavement marker detection device disclosed in Patent Document 1, a range for performing recognition processing of a pavement marker within the captured image is limited to the self vehicle traveling area, to thereby reduce the processing time and prevent erroneous detection of an image area in a similar shape to that of the pavement marker, which is present outside the running road area.

Patent Document 2 discloses an image recognition device including a plurality of image capturing device for photographing various directions from a vehicle. The device selects one of the image capturing device according to self vehicle positional information, information regarding position and type of a pavement marker painted on the pavement near the self vehicle, weather information, brightness information, and vehicle speed information, and performs recognition of a pavement marker with respect to the image captured by the selected image capturing means. For example, in the case of a road in dark at night, a front-camera image in which a clear image can be captured by means of vehicle headlights is selected, and when the vehicle speed is high, a front-camera image in which can an object in an image can be captured for a long time is selected.

Patent Document 1: Japanese Unexamined Patent Publication 2006-24105

Patent Document 2: Japanese Unexamined Patent Publication 2007-147564

DISCLOSURE OF THE INVENTION

Problems to be Solved by the Invention

However, in the art disclosed in Patent Documents 1 and 2, as a pavement marker is recognized only with tone or color information within an image area corresponding to the pavement, if the quality of the recognition object is deteriorated as in the case of a badly worn-off pavement marker, the recognition performance will be degraded. As such, if a tone similar to the recognition object is generated on the running pavement such as a shade similar in shape to a pavement marker due to environmental light or the like, a problem of erroneously recognizing it as a pavement marker is involved.

In view of the above, an object of the present invention is to provide a pavement marker recognition device, a pavement marker recognition method, and a pavement marker recognition program for accurately recognizing pavement markers without any erroneous recognition even if there are worn-off pavement markers or shades similar in shape to pavement markers.

Means for Solving the Problems

In order to achieve the above object, a pavement marker recognition device includes, a correspondence table data storage unit which stores, in advance, a road shape and pavement marker correspondence table showing correspondence relationships between a plurality of types of pavement markers and road shapes; a pavement marker candidate extraction unit which extracts an image area having a feature similar to that of a pavement maker from an image captured by a car-mounted camera as a pavement marker candidate area; a road shape analysis unit which analyzes a road shape from the image captured by the car-mounted camera; and a pavement marker verification unit which determines whether or not the road shape analyzed by the road shape analysis unit and the pavement marker candidate area extracted by the pavement marker candidate extraction unit is in a correspondence relationship shown in the road shape and pavement marker correspondence table, and based on the determination result, determining whether or not the pavement marker candidate area is a true pavement marker.

Further, a pavement marker recognition method of the present invention includes, a road shape analyzing step for analyzing a road shape from an image captured by a car-mounted camera; a pavement marker candidate area extracting step for extracting an image area having a feature similar to that of a pavement marker from the image captured by the car-mounted camera as a pavement marker candidate area; and a pavement marker verifying step for determining whether or not the road shape analyzed in the road shape analyzing step and the pavement marker candidate area extracted in the pavement marker candidate area extracting step are in a correspondence relationship shown in a road shape and pavement marker correspondence table, and based on the determination result, determining whether or not the pavement marker candidate area is a true pavement marker.

Further, a pavement marker recognition program of the present invention causes a computer to perform, a road shape analyzing function for analyzing a road shape from an image captured by a car-mounted camera; a pavement marker candidate area extracting function for extracting an image area having a feature similar to that of a pavement marker from the image captured by the car-mounted camera as a pavement marker candidate area; and a pavement marker verifying function for determining whether or not the road shape analyzed by the road shape analyzing function and the pavement marker candidate area extracted by the pavement marker candidate area extracting function are in a correspondence relationship shown in a road shape and pavement marker correspondence table, and based on the determination result, determining whether or not the pavement marker candidate area is a true pavement marker.

Effect of the Invention

As the present invention extracts an image area similar in shape to a pavement marker from an image captured by a car-mounted camera and analyzes a road shape, and recognizes a pavement marker using both the extracted pavement marker candidate area and the analyzed road shape, the present invention is capable of realizing pavement marker recognition with high accuracy.

BEST MODES FOR CARRYING OUT THE INVENTION

Hereinafter, exemplary embodiments of the invention will be described in detail based on the drawings.

First Exemplary Embodiment

FIG. 1 is a functional block diagram showing the configuration of a pavement marker recognition device of a first exemplary embodiment. Referring to FIG. 1, the pavement marker recognition device of the first exemplary embodiment includes, a road shape analysis unit 11 which analyzes the shape of a road from an image captured by a car-mounted camera for capturing a pavement from a vehicle, a pavement marker candidate extraction unit 12 which extracts, as a pavement marker candidate area, an image area having a feature similar to that of a pavement marker from the captured image by the car-mounted camera, a correspondence table data storage unit 13 which stores a road shape and pavement marker correspondence table showing the correspondence relationships between various pavement markers and road shapes, and a pavement marker verification unit 14 which determines whether or not the pavement marker candidate area extracted by the pavement marker candidate extraction unit 12 and the road shape analyzed by the road shape analysis unit 11 are in a correspondence relationship shown in the road shape and pavement marker correspondence table, and based on the determination result, recognizes the pavement marker candidate area as a true pavement marker.

The pavement marker candidate extraction unit 12 receives a captured image from a car-mounted camera, and from this image, extracts an image area having a feature similar to that of a pavement marker, which is a recognition object, as a pavement marker candidate area. Specifically, the pavement marker candidate extraction unit 12 may be configured to perform template matching on the image captured by the car-mounted camera using a pavement marker pattern as a template and extract an image area having the highest consistency with the template, or to create a pavement marker recognition dictionary from a plurality of pavement marker patterns by a statistical learning method and extract an image area having the highest consistency with the dictionary.

The pavement marker candidate extraction unit 12 of the first exemplary embodiment is configured to extract an image area having a feature similar to that of a pavement marker so as to also extract a pattern which has been worn off at a certain level, such as a worn-off pavement marker. As such, the pavement marker candidate extraction unit 12 extracts an image area having a feature similar to that of a pavement marker such that not only a pattern coincides with the pavement marker but also a pattern similar to the road marker, although it is worn off, are extracted. If an image of a T-junction as shown in FIG. 4 is captured by the car-mounted camera for example, the pavement marker candidate extraction unit 12 sets the T-marker as an extraction object, and extracts, as pavement marker candidates, an image area 41 of the T-marker and an image area 42 in a T-shape consisting of a white line and a stop line. As the part such as the image area 42 has a shape of similar tone to that of the T-shape marker, if extraction processing is performed based on the tones of the pixels on the pavement, it may be extracted by mistake as a pavement marker. However, the pavement marker extraction unit 12 of the present exemplary embodiment does not perform extraction processing based on the tones of the pixels of the pavement.

The pavement marker candidate extraction unit 12 outputs the extracted pavement marker candidate areas as information indicated by the positional information and type names. The types of pavement markers include a T-shape, a cross-shape, a straight-ahead array, and a stop line, for example. The positional information may be indicated by coordinate values on a two-dimensional pavement plane of two axes consisting of, with a point set on the pavement vertically below the position of the car-mounted camera being the origin, an axis formed by vertically projecting the optical axis of the car-mounted camera onto the pavement, and an axis orthogonal thereto, or may be indicated by an absolute coordinate system using latitude and longitude or the like.

The road shape analysis unit 11 of the first exemplary embodiment receives an image from the car-mounted camera in the same manner as that of the pavement marker candidate extraction unit 12, analyzes and recognizes the road shape from this image, and outputs information indicating the recognized road shape as road shape information. The road shape information may be information representing whether there is a wall or an obstacle around the camera-mounting vehicle and its present location, in a two-dimensional or three-dimensional map, or information in which a partial shape of the wall or the obstacle is analyzed and applied to a basic shape such as a two-track road, a three-track road, a cross junction, a T junction, a right curve of 100R, or the like, and its position is described in detail using numerical parameters.

An exemplary content of road shape analysis performed by the road shape analysis unit 11 will be described with reference to FIG. 5. FIG. 5 illustrates a state of a traveling camera-mounting vehicle viewed from immediately above, showing the case in which when the vehicle moves from a point 51 to a point 52 by a distance 53, a point 54 is observed in respective directions of an angle 55 and an angle 56 relative to the camera light axis direction. In this case, as the distance 53, the angle 55, and the angle 56 are measurable, the road shape analysis unit 11 calculates the position of the point 54 relative to the vehicle using the principle of triangulation.

It should be noted that the road shape analysis unit 11 may calculate the distance 53 from the difference between pieces of latitude and longitude information at the point 51 and the point 52 acquired using a GPS device, or may calculate the distance 53 from vehicle speed pulse information during the period when the vehicle moves from the point 51 to the point 52. Further, the angle 55 and the angle 56 may be calculated based on the car-mounted camera parameter and the pixel position in the image corresponding to the point 54.

In this way, as the road shape analysis unit 11 calculates a relative position to the vehicle at one point on the real world, the road shape analysis unit 11 calculates a distance to a wall (object) around the vehicle by setting a number of points which are subjects of position calculation, and creates a two-dimensional or three-dimensional map. Further, the road shape analysis unit 11 may create a map of a broader range by overlapping two-dimensional or three-dimensional maps acquired at respective times based on the vehicle travel amount.

FIG. 6 shows map information generated as a result of analyzing, by the road shape analysis unit 11, a road shape from an image captured by a car-mounted camera for capturing front of the vehicle, illustrating an example of a two-dimensional map of a pavement in front of the vehicle viewed from the above. In the two-dimensional map of FIG. 6, respective black points shows positions of walls (objects) around the road. In FIG. 6, no wall is extracted in a range 61, and a wall extending in a right direction is observed in a range 62, while a long wall is observed in a range 63 on the left side. As such, it is assumed that an area 64 is a T-junction. In this case, the road shape analysis unit 11 determines that the area 64 is a T-junction, and also calculates positional information of an angle 65 of the T-junction relative to the vehicle at the captured time, and positional information of the wall in the range 63.

Although the example that the road shape analysis unit 11 analyzes the road shape from the images in time series based on the principle of triangulation has been described, the road shape may be determined from analysis of each of the frame images. For example, a white line may be extracted with use of a visible light camera, or a plane having wavelength characteristics unique to asphalt or concrete may be extracted with use of a multi-band camera so as to identify their positions based on camera parameters.

A road shape and pavement marker correspondence table is table data in which types of pavement markers and road shapes are correlated. FIG. 7 shows an example of a road shape and pavement marker correspondence table. As shown in FIG. 7, it is defined that a pavement marker "stop" is present immediately before and immediately after a junction, and that a pavement marker "stop line" is present immediately before and immediately after a junction and also before and after a crosswalk.

On the contrary, the road shape and pavement marker correspondence table may be one showing road shapes of locations where respective types of pavement markers are not present. An example of this case is shown in FIG. 8. As shown in FIG. 8, it is defined that a "T-marker" is not present at a location on a road where the right and left sides thereof are completely surrounded by walls, and that an "arrow" indicating a right turn or a left turn is not present on a road of a double lane.

Further, the road shape and pavement marker correspondence table may be one defining both road shapes in which respective pavement marker are present and road shapes in which respective pavement marker are not present. By defining both, omission of recognition by a pavement marker verification unit 14 can be reduced.

As such, the road shape and pavement marker correlation table shows information defining, regarding various types of pavement markers, one of road shapes where the pavement markers are present, road shapes where the pavement markers are not present, and both road shapes where the pavement markers are present and the pavement markers are not present.

The pavement marker verification unit 14 has a function of receiving road shape information which is an analysis result from the road shape analysis unit 11, receiving types and positional information of pavement marker candidate areas from the pavement marker candidate extraction unit 12, and determining presence or absence of a pavement marker based on the positional relationship between the road shape and the pavement marker candidate area. FIG. 9 shows examples of analysis results of the road shapes and extraction results of pavement marker candidate areas. In FIG. 9, positional information is described only for a distance in a light axis direction of a car-mounted camera, and a coordinate value on an axis orthogonal thereto is omitted.

An item (a) of FIG. 9 shows the case where it is recognized that a T-junction is present 3 to 5 meters ahead of the vehicle as a result of road analysis, and a T marker is extracted 3 meters ahead of the vehicle as a pavement marker candidate area. In this case, as there is no contradiction in the correspondence relationship shown by the road shape and pavement marker correspondence table, the pavement marker verification unit 14 determines that there is a T-marker.

An item (b) of FIG. 9 shows the case where it is recognized that walls are present in a range of 2 to 8 meters ahead of the vehicle on the right and left sides as a result of road analysis, and a T-marker is extracted 3 meters ahead of the vehicle as a pavement marker candidate area. In this case, as this means that a T-marker is present in a location other than a T-junction so that this contradicts the correspondence relationship shown by the road shape and pavement marker correspondence table, the pavement marker verification unit 14 determines that there is no T-marker.

An item (c) of FIG. 9 shows the case where it is recognized that a vehicle is traveling on the center lane of three-lane road as a result of road analysis, and a T-marker is extracted 3 meters ahead of the vehicle as a pavement marker candidate area. In this case, as a T-marker will never be present on a three-lane road so that it contradicts the correspondence relationship shown by the road shape and pavement marker correspondence table, the pavement marker verification unit 14 determines that there is no T-marker.

As described above, according to the first exemplary embodiment, as presence or absence of a pavement marker is determined based on both the result of analyzing the road shape and the result of extracting the pavement marker candidate area, the first exemplary embodiment has an advantageous effect of improving recognition accuracy, compared with the case where a pavement marker pattern is not observed appropriately due to the pavement marker being worn off or due to a shade on the pavement caused by environmental light, or the case where road shape analysis is not performed.

In the first exemplary embodiment, although the pavement marker verification unit 14 verifies presence or absence of a pavement marker by calculating a logical multiplication of the analysis result of the road shape near the vehicle and the extracted pavement marker candidate area, if output data from each of the pavement marker candidate extraction unit 12 and the road shape analysis unit 11 is configured to include a value of credibility showing the reliability of the data, the pavement marker verification unit 14 may be configured to finally determine presence or absence of a pavement marker based on each credibility.

For example, if the correspondence relationship between the analysis result of the road shape and the extracted pavement marker candidate area does not contradict the correspondence relationship shown by the road shape and pavement marker correspondence table, computation is performed in accordance with an equation of (final credibility)=(credibility of road shape analysis
result)+(credibility of extracted pavement marker
candidate area), and presence or absence of a pavement marker is finally determined according to the result of comparing the value of the calculated final credibility with a threshold. On the other hand, if the correspondence relationship between the analysis result of the road shape and the extracted pavement marker candidate area contradicts the correspondence relationship shown by the road shape and pavement marker correspondence table, computation is performed in accordance with an equation of (final credibility)=(credibility of extracted pavement
marker candidate area)−(credibility of road shape
analysis result)

and presence or absence of a pavement marker is finally determined according to the result of comparing the value of the calculated final credibility with a threshold.

Further, if the road shape analysis unit 11 was not able to perform analysis of a road shape, the pavement marker verification unit 14 may be adapted to determine presence or absence of a pavement marker only based on the recognition result of the pavement marker candidate area by the pavement marker candidate extraction unit 12.

It is noted that the functions of the road shape analysis unit 11, the pavement marker candidate extraction unit 12, and the pavement marker verification unit 14 may be programmed so as to be executed by a computer.

Next, operation of the pavement marker recognition device of the first exemplary embodiment will be described. As operation described below is an exemplary embodiment of a pavement marker recognition method of the present invention, each of the steps of the pavement marker recognition method will be shown according to the description of the corresponding operation.

FIG. 2 is a flowchart showing the operation of the pavement marker recognition device of the first exemplary embodiment.

First, the road shape analysis unit 11 analyzes a road shape from an image captured by the car-mounted camera (step S201 in FIG. 2, road shape analyzing step). The pavement marker candidate extraction unit 12 extracts an image area similar to a pavement marker from the image captured by the car-mounted camera as a pavement marker candidate area (step S202 in FIG. 2, pavement marker candidate area extracting step). Then, the pavement marker verification unit 14 matches the analysis result of the road shape to the extracted pavement marker candidate area to determine whether or not the result coincide with the content of the road shape and pavement marker correspondence table, determines presence or absence of a pavement marker according to the determination result, and outputs this determination result (step S203 in FIG. 2, pavement marker verifying step). Then, these operations (steps S201 to S203 in FIG. 2) are repeated at captured time of each of the frames or at each predetermined time, as long as images captured by the car-mounted camera are input to the road shape analysis unit 11 and the pavement marker candidate extraction unit 12, and when no image captured by the car-mounted camera is input to the road shape analysis unit 11 and the pavement marker candidate extraction unit 12, the operation ends.

Although FIG. 2 shows an exemplary operation in which both the road shape analysis (step S201 in FIG. 2) and the pavement marker candidate area extraction (step S202 in FIG. 2) are regularly performed, the present invention is not limited to this example. It is also acceptable to perform road shape analysis only when a pavement marker candidate area is extracted. FIG. 3 shows an exemplary operation of this case.

As show in FIG. 3, first, the pavement marker candidate extraction unit 12 performs pavement marker candidate area extraction (step S301 in FIG. 3), and if no pavement marker candidate area is extracted, the step goes to the process of the next frame, and only when at least one pavement marker candidate area is extracted, the road shape analysis unit 11 performs road shape analysis (step S303 in FIG. 3). Then, the pavement marker verification unit 14 matches the extracted pavement marker candidate area and the result of road shape analysis to the road shape and pavement marker correspondence table, and if the result coincides with the condition, determines that a pavement marker is present (step S304 in FIG. 3). These operations (steps S301 to S304 in FIG. 3) are repeated each capturing time for each of the frames, as long as images captured by the car-mounted camera are input to the road shape analysis unit 11 and the pavement marker candidate extraction unit 12.

According to these exemplary operations, it is only necessary to perform the road shape analysis (step S302 in FIG. 3) when a pavement marker candidate area is extracted in the pavement marker candidate area extraction (step S301 in FIG. 3), so that it is possible to reduce the calculation amount in the frames where no pavement marker is present.

As described above, in the first exemplary embodiment, an attention is paid to the fact that various types of pavement markers are respectively present on pavements having particular road shapes. As such, a pavement marker candidate area and a road shape are extracted from an image captured by a car-mounted camera, and a pavement marker is recognized with use of these pieces of information together, whereby a worn-off pavement marker which has been difficult to be recognized from tones or color information of the road surface can be recognized accurately by checking the road shape where it is present and its position of the pavement. Further, even in the case where a tone similar to a shape of a pavement marker is formed on the pavement due to the shade caused by the environmental light, the present invention has an advantageous effect of not erroneously detecting, as a pavement marker, a shade generated at a location on the road where a pavement marker would never be present, by verifying the position of the shade and the road shape.

Second Exemplary Embodiment

Next, a second exemplary embodiment according to the invention will be described with reference to the drawings.

Although, in the above first exemplary embodiment, the road shape analysis unit 11 and the pavement marker candidate extraction unit 12 use an image captured by the same car-mounted camera, the second exemplary embodiment is configured such that a road shape analysis unit 21 and a pavement marker candidate extraction unit 22 receive images captured by different car-mounted cameras.

FIG. 10 is a block diagram showing the configuration of a pavement marker recognition device according to the second exemplary embodiment. As shown in FIG. 10, the pavement marker recognition device of the second exemplary embodiment includes, a road shape analysis unit 21 which analyzes the shape of a road from an image captured by a first car-mounted camera; a pavement marker candidate extraction unit 22 which extracts a pavement marker candidate area from an image captured by a second a car-mounted camera which is different from the first car-mounted camera; a correspondence table data storage unit 23 which stores a road shape and pavement marker correspondence table showing the correspondence relationships between various pavement markers and road shapes; a road shape storage unit 25 which stores road shape information which is an analysis result of the road shape analysis unit 21; a travel amount measurement unit 26 which measures a travel amount of a vehicle; and a pavement marker verification unit 24 which correlates the road shape information stored in the road shape storage unit 25 and the extracted pavement marker candidate area and determines presence or absence of a pavement marker based on the fact whether the road shape and the pavement marker candidate area are in a correspondence relationship shown in the road shape and pavement marker correspondence table.

The road shape analysis unit 21 of the second exemplary embodiment is adapted to receive an image captured by the first car-mounted camera for capturing the front of the vehicle. As a car-mounted camera facing the front is generally set such that the light axis thereof is almost horizontal, the camera can capture a distance from the vehicle. As such, the road shape analysis unit 21 may analyze a road shape in a wide range around the vehicle.

On the other hand, the pavement marker candidate extraction unit 22 is adapted to receive an image captured by the second camera for capturing the back of the vehicle. As a car-mounted camera facing the back is generally set such that the light axis thereof is almost vertical, the camera captures an image of the back of the vehicle as if it is viewed downward from the above. As such, a pavement marker is captured in a shape close to the real marker, in the captured image. Accordingly, the pavement marker candidate extraction unit 22 is able to reduce erroneous extraction of a pavement marker candidate area.

The correspondence table data storage unit 23 stores the road shape and pavement marker correspondence table, as the correspondence table data storage unit 13 of the first exemplary embodiment.

The travel amount measurement unit 26 has a function of measuring a travel amount of a vehicle from the time of capturing the previous frame to the time of capturing the current frame based on a GPS, a vehicle speed sensor, or the like, and outputting travel amount information.

The road shape storage unit 25 has a function of storing road shape information which is an analysis result by the road shape analysis unit 21. The road shape information is information including positional information of an object (such as a wall) indicating a feature of a road shape. Although the positional information may be represented as a latitude and a longitude based on the camera parameters of the first car-mounted camera for road shape analysis and the pixel position of the object indicating the feature of the road shape in the captured image, with reference to the absolute positional information (latitude and longitude) of the vehicle obtained from a GPS or the like, in the second exemplary embodiment, it is assumed that the position information is written as a relative position to the vehicle (a relative two-dimensional position to the vehicle on the road plane defined by two axes of an axis formed by projecting the camera light axis on the pavement plane and an axis orthogonal thereto) based on the camera parameter of the first car-mounted camera for road shape analysis and the pixel position of the object indicating the feature of the road shape in the captured image, and that the positional information is updated by modifying each frame relative positional information based on the travel amount of the vehicle.

As such, the road shape analysis unit 21 has a function of modifying the road shape information having been stored in the road shape storage unit 25 based on the travel amount measured by the travel amount measurement unit 26, and additionally writing information of the road shape analyzed from the image captured by the car-mounted camera in the road shape storage unit 25.

The pavement marker verification unit 24 of the second exemplary embodiment relates the road shape information stored in the road shape storage unit 25 to the pavement marker candidate area extracted by the pavement marker candidate extraction unit 22 based on the positional information, matches the positional relationship between the road shape and the pavement marker candidate area to the road shape and pavement marker correspondence table, and if there is no contradiction, recognizes the pavement marker candidate area as a true pavement marker.

The process of determining presence or absence of a pavement marker in the second exemplary embodiment, based on the positional relationship between a road shape and a pavement marker candidate area, will be described in detail with reference to the drawings.

FIG. 11 is an illustration showing that the positions of a vehicle at three times T1, T2, and T3, viewed from the above, are a point 111, a point 112, and a point 113, respectively. A distance between respective points is assumed to be 2 meters.

In FIG. 12, items (a), (b), and (c) show road shape information stored in the road shape storage unit 25 and information of a pavement marker candidate area output from the pavement marker candidate extraction unit 22, at respective times T1, T2, and T3. The positional information in the road shape information is represented as a relative position to the vehicle position at each time.

Referring to (a) of FIG. 12, at the time T1, it is detected by the road shape analysis unit 21 that walls extend on the right and left sides of the vehicle, each of the walls being 1.5 meters distant from the vehicle, and the wall of the left side of the vehicle has an interruption in a range from 2 to 4.5 meters in front of the vehicle. As the place before the interrupted portion of the left-side wall is not seen, no road shape is detected. As no pavement marker candidate area is output from the pavement marker candidate extraction unit 22, the pavement marker verification unit 24 determines that there is no pavement marker candidate area at the time T1.

Referring to (b) of FIG. 12, at the time T2, it is detected by the road shape analysis unit 21 that the left side wall is interrupted in a range between 0 to 2.5 meters from the front of the vehicle, and that the road extends at a right angle from the interrupted part of the left side wall between the time T1 and the time T2. As no pavement marker candidate area is extracted by the pavement marker candidate extraction unit 22, the pavement marker verification unit 24 determines that there is no pavement marker candidate area even at the time T2.

Referring to (c) of FIG. 12, at the time T3, it is detected by the road shape analysis unit 21 that the left side wall is interrupted in a range between 0.5 meters from the front and 2.5 meters from the back of the vehicle, an in the part without the left side wall, a road surface extends at a right angle, so that the vehicle is in a T-junction. By the pavement marker candidate extraction unit 22, a pavement marker candidate area of a T-junction is detected in a range between 0 to 1.5 meters from the back of the vehicle. In this case, as a T-marker which is a pavement marker candidate area exists near the center of the T-junction, the pavement marker verification unit 24 determines that there is a T marker.

In this case, even if the T-marker which is a pavement marker candidate area is a badly worn-off line and extracted as a line in a length of 2 meters, if this line is detected to exist at the center of the T junction, the pavement marker verification unit 24 determines it as a T-marker. This is because as a linear figure which can exist at the center of a T-junction is a T-marker or a while line, and from the detection result of a length of 2 meters, a possibility of the line being a T-marker is very high.

Although the examples of FIGS. 11 and 12 have described the case where a T-marker which is a recognition target is recognized, an example where a pattern, which is not a recognition pattern originally, is extracted as a pavement marker candidate area will be described with reference to FIG. 13.

FIG. 13 shows an analysis result by the road shape analysis unit 21 when the vehicle reaches the points 111, 112, and 113, which are the same as those in FIG. 11, toward the T-junction, and a pavement marker candidate area extracted by the pavement marker candidate extraction unit 22. In this case, it is assumed that the T-marker is completely worn off and cannot be seen, and instead, a stop line painted in white before the junction and a worn-off while line are extracted as a pavement marker candidate area in a shape similar to a T-junction in a range of 2 to 3.5 meters at the back of the vehicle and in an area of 0 to 1.5 meters on the left side of the vehicle. In this case, as the T-marker candidate exists at a position 141 shown in FIG. 14, which is different from a position 142 in FIG. 14 of a normal painted position of a T-marker shown in the road shape and pavement marker correspondence table, the pavement marker verification unit 241 determines not to recognize a T-marker. As described above, even in the case where the candidate is difficult to be distinguished from a T-marker only based on the tones on the pavement, it is possible to prevent erroneous recognition by verifying the positional relationship with the road shape.

It is noted that the pavement marker candidate extraction unit 22, the road shape analysis unit 21, and the pavement marker verification unit 24 may be adapted such that the functions thereof are programmed to be executed by a computer.

Next, operation of the pavement marker recognition device according to the second exemplary embodiment will be described. As the operation described below is an exemplary embodiment of a pavement marker recognition method of the present invention, each of the steps of the pavement marker recognition method will be shown according to the description of the corresponding operation.

FIG. 15 is a flowchart showing the operation of the pavement marker recognition device of the second exemplary embodiment.

First, the travel amount measurement unit 26 measures a travel amount from the time when the previous frame was captured to the time when the current frame was captured (step S151 in FIG. 15, travel amount measuring step). The road shape analysis unit 21 analyzes the road shape from an image of a car-mounted camera for capturing the front of the vehicle (step S152 in FIG. 1, road shape analyzing step). Then, the road shape analysis unit 21 modifies the information stored in the road shape storage unit 25 by a travel amount obtained from the travel amount measurement result by the travel amount measurement unit 26, and additionally writes travel shape information analyzed at the time of capturing the current frame (step S153 in FIG. 15, road shape storing step).

Then, the pavement marker candidate extraction unit 22 extracts a pavement marker candidate area from an image of a car-mounted camera for capturing the back of the vehicle, and outputs the name of type and the positional information (step S154 in FIG. 15, pavement marker candidate area extraction step). The expression of this positional information is consistent with a coordinate system of a positional description in the road shape storage (step S153 in FIG. 15). Then, the pavement marker verification unit 24 reads the information of the road shape from the road shape storage unit 25, determines whether or not the positional relationship between the readout road shape and the pavement marker candidate area is in a correspondence relationship shown in the road shape and pavement marker correspondence table, and based on the determination result, determines whether or not to recognize the pavement marker candidate area as a true pavement marker, and outputs the determination result (step S155 in FIG. 15, pavement marker verifying step). Then, these operations (step S151 to S155 in FIG. 15) are performed at every time or with certain time intervals, as long as images are input to the pavement marker candidate extraction unit 22.

Although the road shape analysis unit 21 performs road shape analysis using an image captured by the car-mounted camera for capturing the front of the vehicle in the above description, the present invention is not limited to this configuration. The present invention may be configured to perform road shape analysis from an image captured by a camera facing a side of the vehicle or an all-round camera, or may use a plurality of cameras. In the case of using a plurality of cameras, if a road shape is analyzed from images captured by the respective cameras and the positional information is expressed in a uniform coordinate system, processing can be performed in the same manner as that of using one front camera. Further, as the pavement marker candidate area extraction (step S154 in FIG. 15) is a process independent of the steps from vehicle travel amount measurement (step S151 in FIG. 15) to road shape storing (step S153 in FIG. 15), the order of performance may be changed as appropriate. Similarly, the order of performance of the vehicle travel amount measurement (step S151 in FIG. 15) and the road shape analysis (step S152 in FIG. 15) may be inverted.

According to the second exemplary embodiment, by using an image from the first car-mounted camera appropriate for road shape analysis and an image from the second car-mounted camera appropriate for pavement marker candidate area extraction, which capture different ranges in the real world, the respective processes of road shape analysis and pavement marker candidate area extraction can be performed with high accuracy. Further, information indicating the road shape analyzed from an image by the first camera facing the front of the vehicle is stored, and the pavement marker candidate area extracted from an image by the second camera facing downward in the back of the vehicle is matched to the stored road shape information so as to determine whether they are in a correspondence relationship shown in the road shape and pavement marker correspondence table, and based on the determination result, the pavement marker candidate area is recognized as a true pavement marker. As such, a pavement marker can be recognized with higher accuracy.

Third Exemplary Embodiment

Next, a third exemplary embodiment of the invention will be described.

Although the pavement marker recognition device of the first exemplary embodiment is configured such that the pavement marker candidate extraction unit 12 extracts a pavement marker candidate, and the pavement marker verification unit 14 verifies the positional relationship between the pavement marker candidate and the road shape, a pavement marker recognition device according to the third exemplary embodiment is configured to include a pavement marker recognition unit 34 in which the functions of the pavement marker candidate extraction unit 12 and the pavement marker verification unit 14 are integrated.

FIG. 16 is a functional block diagram showing the configuration of the pavement marker recognition device according to the third exemplary embodiment. As shown in FIG. 16, the pavement marker recognition device of the third exemplary embodiment includes a road shape analysis unit 31 which analyzes a road shape from an image captured by a car-mounted camera, a correspondence table data storage unit 33 which stores a road shape and pavement marker correspondence table showing the correspondence relationships between a plurality of types of pavement markers and road shapes, and a pavement marker recognition unit 34 which recognizes a pavement marker of a type consistent with the road shape information output from the road shape analysis unit 31 and the content of the road shape and pavement marker correspondence table, from an image captured by the car-mounted camera.

The correspondence table data storage unit 33 stores the road shape and pavement marker correspondence table, as the correspondence table data storage unit 13 of the first exemplary embodiment.

The pavement marker recognition unit 34 reads out the road shape and pavement marker correspondence table from the correspondence table storage unit 33 and refers to it, identifies the type of the pavement marker corresponding to the road shape recognized by the road shape analysis unit 31 based on the road shape and pavement marker correspondence table, and recognizes the identified type of pavement marker from the image captured by the car-mounted camera.

As a recognizing process of the pavement marker using the road shape information by the pavement marker recognition unit 34, the process may be configured to perform matching to a T-marker template, only on the inside an area 181 recognized as a T-junction as shown in FIG. 18.

Further, as shown in FIG. 19, it is also acceptable that the process is configured to create a two-dimensional map in which areas 191, 192, 193 having different presence probabilities of a T-marker are set within an image 190, and sets map values indicating the possibility of a pavement marker being present to the respective areas to thereby perform matching to the T-marker template.

In this case, the probability of a T-marker being present is the largest in the area 191, and the probability is reduced in the order of the area 192 and the area 193. As such, it is acceptable to set map values indicating the possibilities of a T-marker being present to be (map value of area 191)>(map value of area 192)>(map value of area 193) to perform matching to the T-marker template, and perform computation in accordance with the following equation:

(pavement marker recognition function value)=$\alpha$*
(degree of coincidence of template)+(1−$\alpha$)*(map
value of portion where the center pixel of template coincides)

so as to calculate a function value for adding both the degree of coincidence of the template and the degree of conformity of the position relative to the road shape, to thereby recognize the pavement marker based on the result of comparing the function value with a threshold. In this equation, "$\alpha$" represents a constant value determining the weight. Further, although the respective areas 191, 192, and 193 in FIG. 19 are shown as rectangle areas, they may be concentric circle areas.

It is noted that the road shape analysis unit 11 and the pavement marker recognition unit 34 of the third exemplary embodiment may be configured such that the functions thereof are programmed to be executed by a computer.

Next, operation of the third exemplary embodiment will be described. As operation described below is an exemplary embodiment of a pavement marker recognition method of the present invention, each of the steps of the pavement marker recognition method will be shown according to the description of the corresponding operation.

FIG. 17 is a flowchart showing the operation of the pavement marker recognition device of the third exemplary embodiment.

First, the road shape analysis unit 31 analyzes the road shape and its position from an image captured by a car-mounted camera (step S171 in FIG. 17, road shape analyzing step). The pavement marker recognition unit 34 identifies a pavement marker determined to be present on a pavement in a road shape recognized by the road shape analysis unit 31, based on the content of the road shape and pavement marker correspondence table, and recognizes the pavement marker from the image captured by the car-mounted camera (step S172 in FIG. 17, pavement marker recognizing step). Then, as long as images are input to the road shape analysis unit 31, these operations (steps S171 to S172 in FIG. 17) are performed every time or at predetermined time intervals.

According to the third exemplary embodiment, as the recognition process is performed only on the pavement marker corresponding to the analyzed road shape, a process load can be reduced compared with the case of performing the recognition process on all types of pavement markers, whereby quick and accurate pavement marker recognition can be performed.

While the present invention has been described with reference to the embodiments (and examples), the present invention is not limited to the above embodiments (and examples). Various changes in form and details of the present invention, which can be understood by those skilled in the art, may be made within the scope of the present invention.

This application is based upon and claims the benefit of priority from Japanese patent application No. 2007-314512, filed on Dec. 5, 2007, the disclosure of which is incorporated herein in its entirety by reference.

BRIEF DESCRIPTION OF THE DRAWINGS

FIG. 7 is an illustration showing an example of a road shape and pavement marker correspondence table in the exemplary embodiment disclosed in FIG. 1;

FIG. 8 is an illustration showing another example of a road shape and pavement marker correspondence table in the exemplary embodiment disclosed in FIG. 1;

FIG. 9 is a table showing examples of road shape analysis results and pavement marker candidate area recognition results in the exemplary embodiment disclosed in FIG. 1;

FIG. 10 is a functional block diagram showing the configuration of a pavement marker recognition device of a second exemplary embodiment according to the invention;

FIG. 11 is an illustration showing a vehicle positions at three times passing through a T-junction;

FIG. 12 is a table showing an example of a road shape recognized using a car-mounted camera of the vehicle shown in FIG. 11 and a pavement marker candidate area, in the exemplary embodiment disclosed in FIG. 10;

FIG. 13 is a table showing another example of a road shape recognized by the car-mounted camera of the vehicle shown in FIG. 11 and a pavement marker candidate area, in the exemplary embodiment disclosed in FIG. 10;

Figure 1:
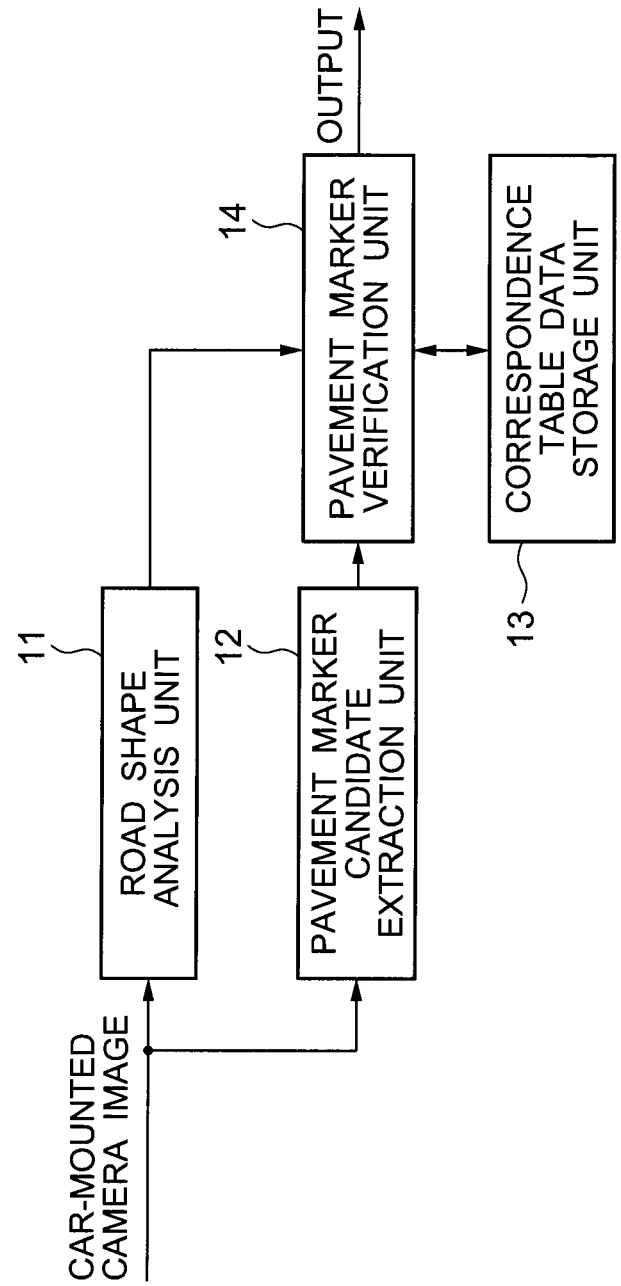
FIG. 1 is a functional block diagram showing the configuration of a pavement marker recognition device of the first exemplary embodiment according to the invention.
Figure 2:
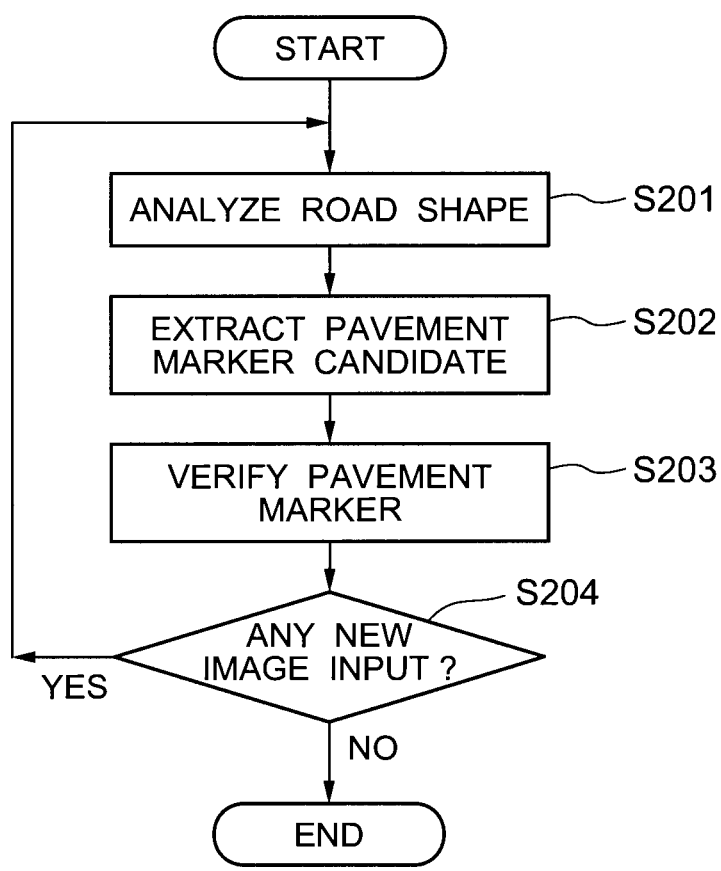
FIG. 2 is a flowchart showing exemplary an operation of the pavement marker recognition device of the exemplary embodiment disclosed in FIG. 1.
Figure 3:
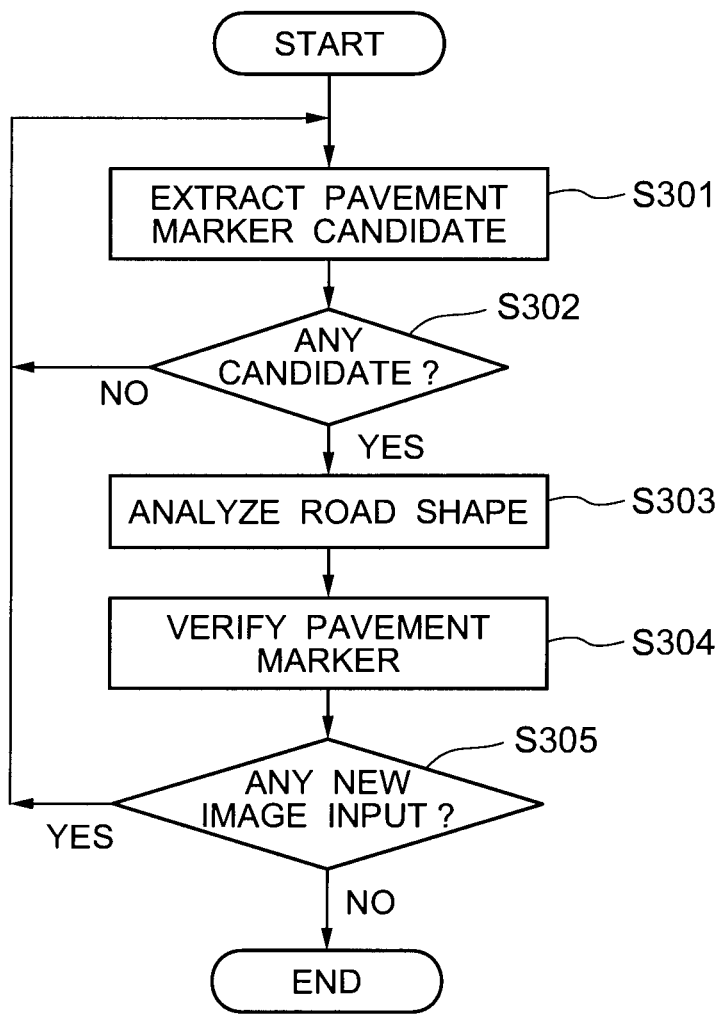
FIG. 3 is a flowchart showing another exemplary operation of the pavement marker recognition device of the exemplary embodiment disclosed in FIG. 1.
Figure 4:
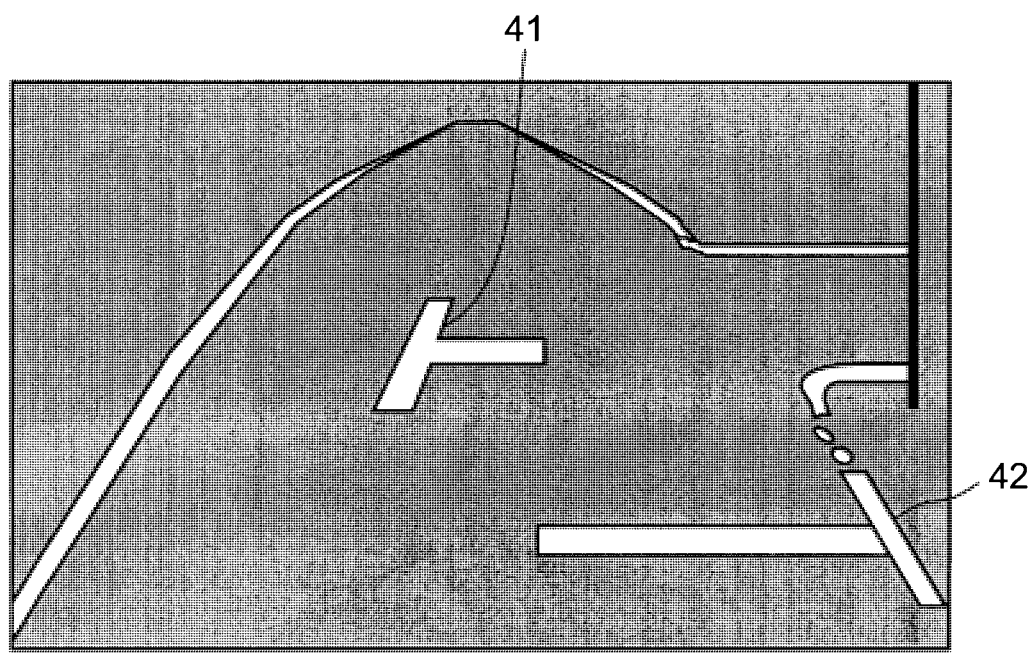
FIG. 4 is an illustration showing an example of an input image of the pavement marker recognition device of the exemplary embodiment disclosed in FIG. 1.
Figure 5:
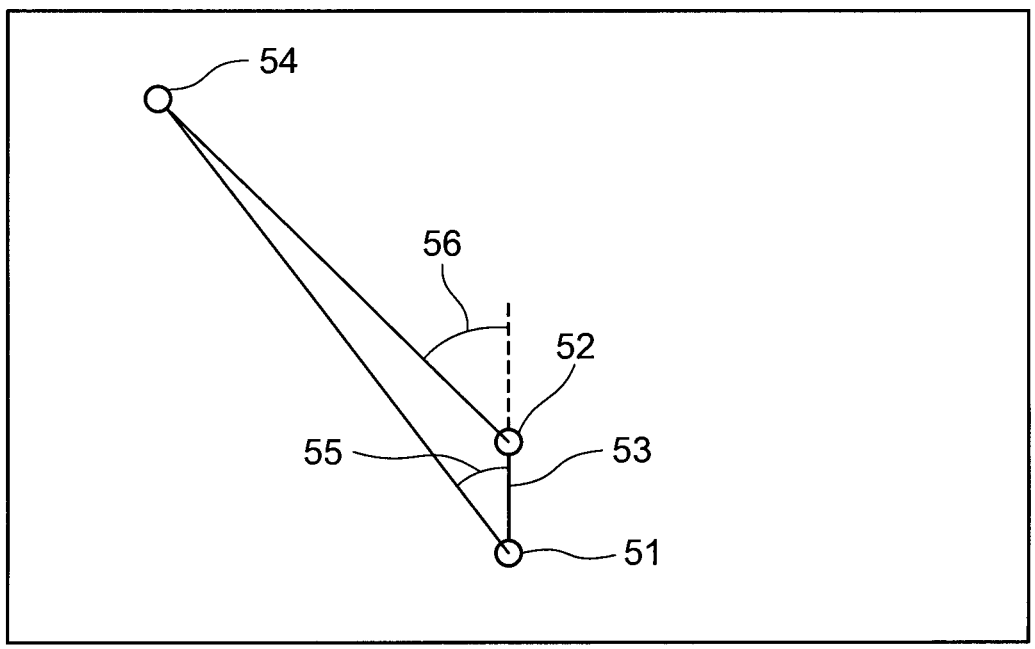
FIG. 5 is an illustration showing an example of the principle of road shape analysis performed by the road shape analysis unit in the exemplary embodiment disclosed in FIG. 1.
Figure 6:
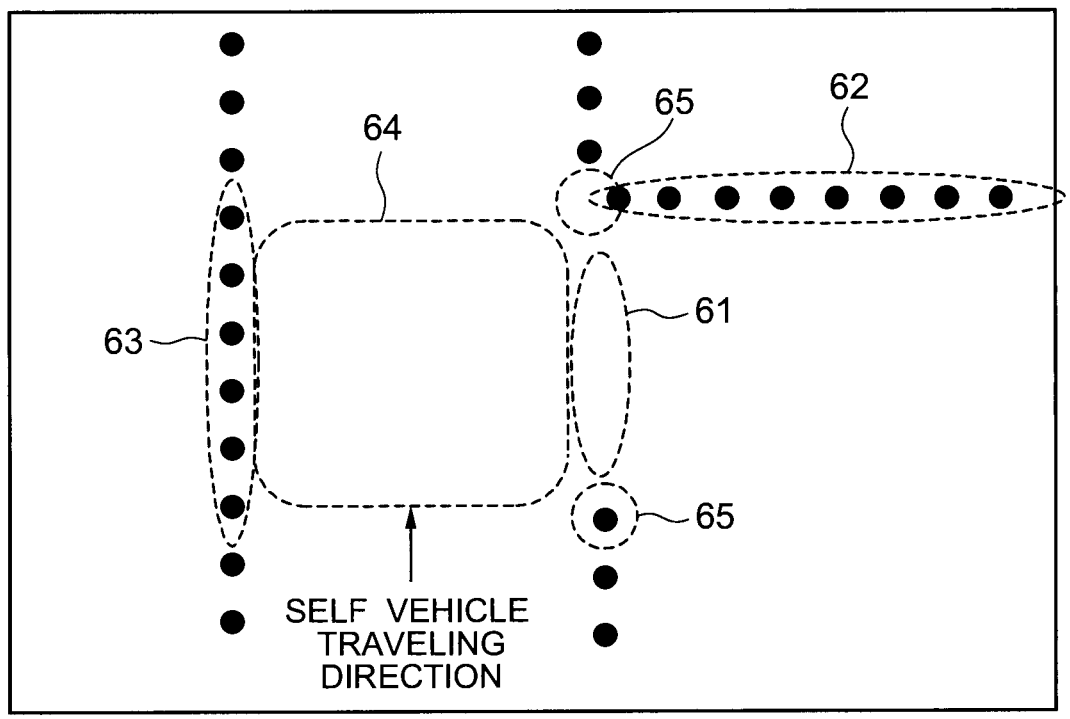
FIG. 6 is an illustration showing an example of a road analysis result by the road shape analysis unit in the exemplary embodiment disclosed in FIG. 1.
Figure 14:
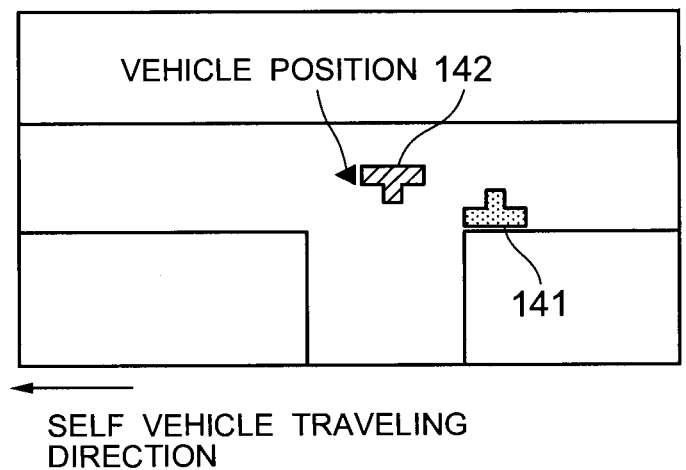
FIG. 14 is an illustration showing a present position of the pavement marker candidate area on a road shape analysis result in an overlapped manner, in the exemplary embodiment disclosed in FIG. 10.
Figure 15:
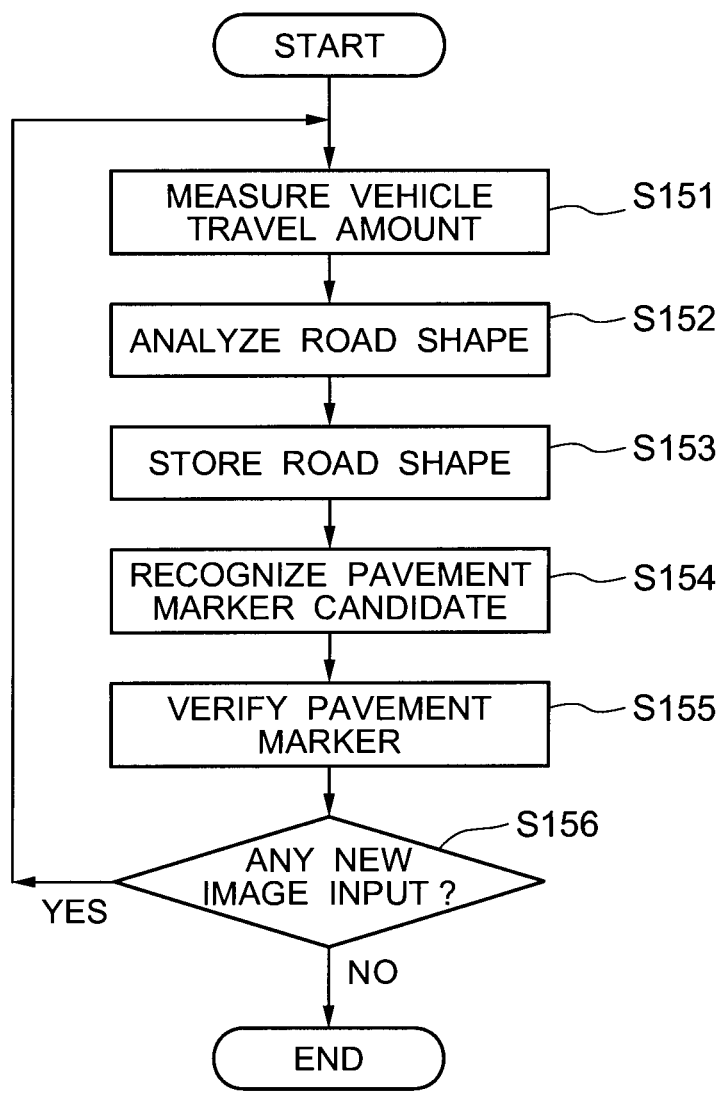
FIG. 15 is a flowchart showing an operation of the pavement marker recognition device of the exemplary embodiment disclosed in FIG. 10.
Figure 16:
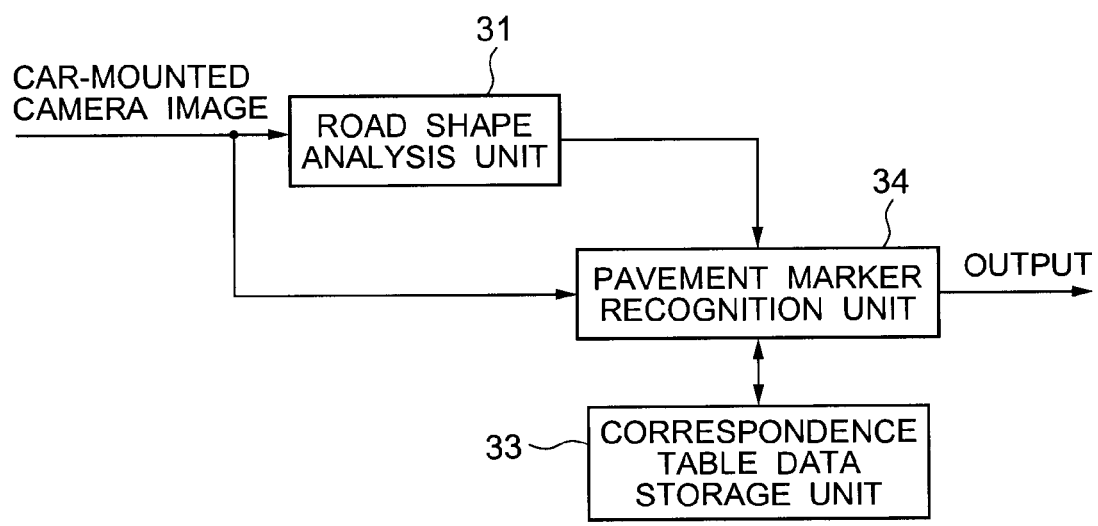
FIG. 16 is a functional block diagram showing the configuration of a pavement marker recognition device of a third exemplary embodiment according to the invention.
Figure 17:
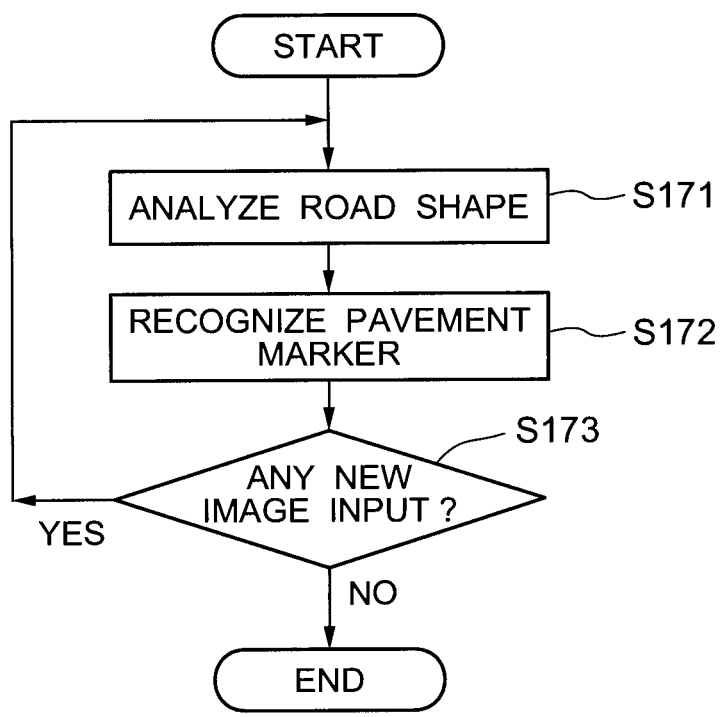
FIG. 17 is a flowchart showing an operation of the pavement marker recognition device of the exemplary embodiment disclosed in FIG. 16.
Figure 18:
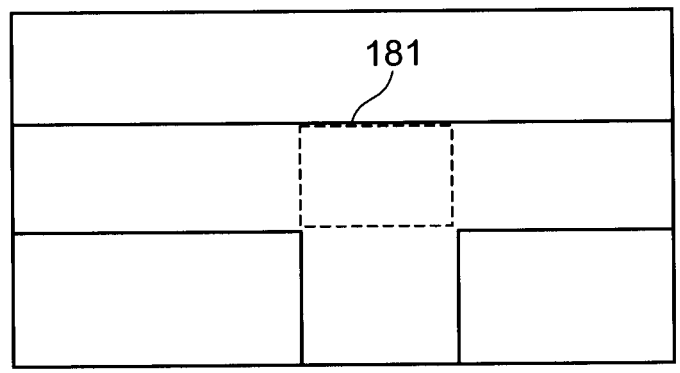
FIG. 18 is an illustration showing a template matching process target range set based on a road shape analysis result in the exemplary embodiment disclosed in FIG. 16.
Figure 19:
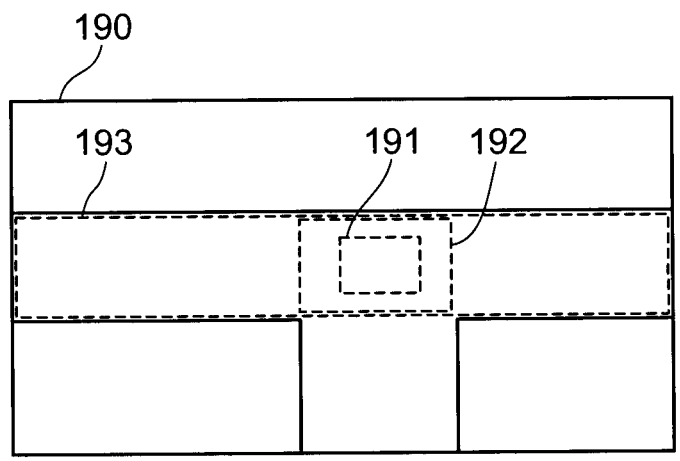
FIG. 19 is an illustration showing respective areas having different probabilities of T-marker present possibility set based on a road shape analysis result in the exemplary embodiment disclosed in FIG. 16.

REFERENCE NUMERALS 11, 21, 31 Road shape analysis unit
12, 22 Pavement marker candidate extraction unit
13, 23, 33 Correspondence table data storage unit
14, 24 Pavement marker verification unit
25 Road shape storage unit
26 Travel amount measurement unit
34 Pavement marker recognition unit
51 Vehicle position
52 Vehicle position after traveling
53 Travel distance of vehicle
54 Recognition target point
55 Angle defined by a direction from a vehicle to a recognition target point and a light axial direction of a car-mounted camera
56 Angle defined by a direction from a vehicle to a recognition target point and a light axial direction of a car-mounted camera
61 Range with no wall detected on the right relative to a vehicle travel direction
62 Range of a wall detected in right ahead direction relative to a vehicle travel direction
63 Range of a wall detected on the left relative to a vehicle travel direction
64 Range recognized as T-junction
65 Point recognized as a corner of T-junction

The invention claimed is:

1. A pavement marker recognition device mounted on a vehicle for recognizing a plurality of types of pavement markers of a road based on an image obtained by capturing the surface of the road ahead of the vehicle, the pavement marker recognition device comprising:

a correspondence table data storage unit which stores, in advance, a road shape and pavement marker correspondence table showing correspondence relationships between the plurality of types of pavement markers and road shapes;

a car-mounted camera which captures simultaneously a road shape and a surface of the road on which the vehicle is actually traveling; and a computer, wherein the computer operates:

a road shape analysis unit which is configured to analyze the road shape from an image of the shape of the road captured by the car-mounted camera;

a pavement marker candidate extraction unit which is configured to extract, in addition to an image area having a feature coincides with a feature of a pavement marker, an image area having a feature similar to a feature of the pavement marker although it is worn off from the image of the road shape captured by the car-mounted camera as a pavement marker candidate area; and a pavement marker verification unit which is configured to determine whether or not the pavement marker candidate area extracted by the pavement marker candidate extraction unit and the road shape analyzed by the road shape analysis unit are in a correspondence relationship shown in the road shape and pavement marker correspondence table of the correspondence table data storage unit, and based on the determination result, recognize the pavement marker candidate area as a true pavement marker, wherein the pavement marker candidate extraction unit is further configured to create a pavement marker recognition dictionary from a plurality of pavement marker patterns by a statistical learning method and extract an image area having the highest consistency with the pavement marker recognition dictionary from the image captured by the car-mounted camera.

2. The pavement marker recognition device, according to claim 1, wherein the road shape analysis unit and the pavement marker candidate extraction unit configured to respectively use images captured from different angles, the pavement marker recognition device includes a road shape storage unit configured to store information of the road shape analyzed by the road shape analysis unit, and the pavement marker verification unit configured to acquire the information of the road shape by reading the information from the road shape storage unit.

3. The pavement marker recognition device, according to claim 2, further comprising a travel amount measurement unit configured to measure a travel amount of a vehicle provided with a car-mounted camera, wherein the road shape analysis unit configured to modify the road shape information stored in the road shape storage unit based on the measured travel amount, and additionally configured to write information of the road shape analyzed from an image of the car-mounted camera.

4. The pavement marker recognition device, according to claim 3, wherein the pavement marker candidate extraction unit configured to extract the pavement marker candidate area from a captured image by a car-mounted camera facing downward of back of the vehicle.

5. The pavement marker recognition device, according to claim 4, wherein the road shape analysis unit configured to analyze a road shape from a captured image by a car-mounted camera of at least one of a car-mounted camera facing front of the vehicle, a car-mounted camera facing a side of the vehicle, and an all-round car-mounted camera.

6. The pavement marker recognition device, according to claim 1, further comprising a pavement marker recognition unit in place of the pavement marker candidate extraction unit and the pavement marker verification unit, wherein
the pavement marker recognition unit configured to identify a type of a pavement marker corresponding to a road shape analyzed by the road shape analysis unit based on the road shape and pavement marker correspondence table, and configured to recognize a pavement marker of the identified type from the image captured by the car-mounted camera.

7. The pavement marker recognition device, according to claim 1, wherein
the road shape and pavement marker correspondence table is information indicating at least one of road shapes of places where the pavement markers are present, road shapes of places where the pavement markers are absent, and both.

8. A pavement marker recognition method for recognizing a plurality of types of pavement markers of a road based on an image obtained by capturing the surface of the road ahead of a vehicle, the pavement marker recognition method comprising:
storing, in a correspondence table data storage unit, in advance, a road shape and pavement marker correspondence table showing correspondence relationships between the plurality of types of pavement markers and road shapes;
capturing, by a car-mounted camera, simultaneously a road shape and a surface of the road on which the vehicle is actually traveling;
analyzing, by a computer, in a road shape analyzing step, the road shape from an image of the shape of the road captured by the car-mounted camera;
extracting, by the computer, in a pavement marker candidate area extracting step, in addition to an image area having a feature coincides with a feature of a pavement marker, an image area having a feature similar to a feature of the pavement marker although it is worn off from the image of the road shape captured by the car-mounted camera as a pavement marker candidate area;
determining, by the computer, in a pavement marker verifying step, whether or not the pavement marker candidate area extracted in the pavement marker candidate area extracting step and the road shape analyzed in the road shape analyzing step are in a correspondence relationship shown in the road shape and pavement marker correspondence table of the correspondence table data storage unit, and based on the determination result, recognizing the pavement marker candidate area as a true pavement marker;
creating, by the computer, a pavement marker recognition dictionary from a plurality of pavement marker patterns by a statistical learning method; and
extracting, by the computer, an image area having the highest consistency with the pavement marker recognition dictionary from the image captured by the car-mounted camera.

9. The pavement marker recognition method, according to claim 8, wherein in the road shape analyzing step and the pavement marker candidate area extracting step, images captured from different angles are used respectively, and further comprising:
a road shape storing step for storing information of the road shape analyzed in the road shape analyzing step in the storage section is performed, and
in the pavement marker verifying step, the information of the road shape is read from the storage section.

10. The pavement marker recognition method, according to claim 8, further comprising:
before the road shape analyzing step, a travel amount measuring step for measuring a travel amount of the vehicle provided with the car-mounted camera, wherein
in the road shape analyzing step, the road shape information previously stored in the storage section is modified based on the measured travel amount, and information of the road shape analyzed from the car-mounted camera is additionally written in the storage section.

11. The pavement marker recognition method, according to claim 10, wherein
in the pavement marker candidate area extracting step, the pavement marker candidate area is extracted from a captured image by a car-mounted camera facing downward of back of the vehicle.

12. The pavement marker recognition method, according to claim 11, wherein
in the road shape analyzing step, the road shape is analyzed from a captured image of a car-mounted camera of at least one of a car-mounted camera facing front of the vehicle, a car-mounted camera facing a side of the vehicle, and an all-round car-mounted camera.

13. The pavement marker recognition method, according to claim 8, further comprising:
after the road shape analyzing step, a pavement marker recognizing step in place of the pavement marker candidate area extracting step and the pavement marker verifying step, wherein
in the pavement marker recognizing step, a type of a pavement marker corresponding to the road shape analyzed in the road shape analyzing step is identified based on the road shape and pavement marker correspondence table, and a pavement marker of the identified type is recognized from the image captured by the car-mounted camera.

14. A non-transitory computer readable recording medium storing a pavement marker recognition program for controlling recognition of a plurality of types of pavement markers of a road based on an image obtained by capturing the surface of the road ahead of the vehicle, the pavement marker recognition program causing a computer to perform:
a road shape analyzing function for analyzing the road shape from an image of the shape of the road captured by a car-mounted camera, wherein the car-mounted camera captures simultaneously a road shape and a surface of the road on which the vehicle is actually traveling;
a pavement marker candidate area extracting function for extracting, in addition to an image area having a feature coincides with a feature of a pavement marker, an image area having a feature similar to a feature of the pavement marker although it is worn off from the image of the road shape captured by the car-mounted camera as a pavement marker candidate area; and
a pavement marker verifying function for determining whether or not the pavement marker candidate area extracted by the pavement marker candidate area extracting function and the road shape analyzed by the road shape analyzing function are in a correspondence relationship shown in a road shape and pavement marker correspondence table of the correspondence table data storage unit, and based on the determination result, recognizing the pavement marker candidate area as a true pavement marker, wherein the road shape and pavement marker correspondence table is stored in advance in a correspondence table data storage unit and shows correspondence relationships between the plurality of types of pavement markers and road shapes, wherein the pavement marker candidate area extracting function further creates a pavement marker recognition dictionary from a plurality of pavement marker patterns by a statistical learning method and extracts an image area having the highest consistency with the pavement marker recognition dictionary from the image captured by the car-mounted camera.

15. The non-transitory computer readable recording medium storing the pavement marker recognition program, according to claim 14, wherein in the road shape analyzing function and the pavement marker candidate area extracting function, images captured from different angles are used respectively, and in addition to a road shape storing function for storing information of the road shape analyzed by the road shape analyzing function in the storage section, the program causes the computer to perform the pavement marker verifying function as a function of reading the information of the road shape is from the storage section, determining whether or not a road shape indicated by this information and the pavement marker candidate area extracted by a pavement marker candidate extraction unit is in a correspondence relationship shown in the road shape and pavement marker correspondence table, and based on a determination result, recognizing the pavement marker candidate area as a true pavement marker.

16. The non-transitory computer readable recording medium storing the pavement marker recognition program, according to claim 15, wherein in addition to a travel amount measuring function for measuring a travel amount of the vehicle, the program causes the computer to perform the road shape analyzing function as a function for modifying the road shape information previously stored in the storage section based on the measured travel amount, and additionally writing information of the road shape analyzed from an image captured by the car-mounted camera in the storage section.

17. The non-transitory computer readable recording medium storing the pavement marker recognition program, according to claim 16, wherein the pavement marker candidate area extracting function is a function of extracting the pavement marker candidate area from a captured image by a car-mounted camera facing downward of back of the vehicle.

18. The non-transitory computer readable recording medium storing the pavement marker recognition program, according to claim 17, wherein the road shape analyzing function is a function of analyzing the road shape from a captured image of a car-mounted camera of at least one of a car-mounted camera facing front of the vehicle, a car-mounted camera facing a side of the vehicle, and an all-round car-mounted camera.

19. The non-transitory computer readable recording medium storing the pavement marker recognition program, according to claim 14, wherein in place of the pavement marker candidate area extracting function and the pavement marker verifying function, the program causes the computer to perform a pavement marker recognizing function of reading, from the storage section, and referring to the road shape and pavement marker correspondence table, identifying a type of a pavement marker corresponding to the road shape analyzed by the road shape analyzing function, and recognizing a pavement marker of the identified type from the image captured by the car-mounted camera.

20. The non-transitory computer readable recording medium storing the pavement marker recognition program, according to claim 14, wherein the road shape and pavement marker correspondence table is information indicating at least one of road shapes of places where the pavement markers are present, road shapes of places where the pavement markers are absent, and both.

* * * * *